Nov. 29, 1960 S. LOEWE 2,962,237
BRAKING MAGNETIC TAPE REELS
Filed Oct. 3, 1956

Inventor.
Siegmund Loewe

United States Patent Office 2,962,237

Patented Nov. 29, 1960

2,962,237

BRAKING MAGNETIC TAPE REELS

Siegmund Loewe, 68 Ridge Road, Yonkers, N.Y.

Filed Oct. 3, 1956, Ser. No. 613,794

Claims priority, application Germany Oct. 5, 1955

3 Claims. (Cl. 242—55.12)

In magnetic tape recorders, it is necessary to provide a braking device which stops the movement of the tape immediately. For this purpose, it is usual to lift the tape from the drive unit, e.g. the so-called sound pulley, and the magnetic heads so that it is no longer driven at normal speed and also does not drag unnecessarily on the magnetic heads. The tape is then pressed against a suitable fixed member and stopped.

This braking device does not cause any particular difficulties when it is operated only at the normal tape speed, that is, at the usual tape speed up to about 20 cm. per second. Difficulties, however, do occur to an increasing degree the higher the tape speed is at which the braking is to be effected, in particular at the so-called high speed. In this case the tape is wound off at high speed from one reel to the other. The faster these reels turn, the more kinetic energy must be absorbed by the braking device. Further, this must be performed within a very short period of time in order to stop the movement of the tape almost immediately. Hereby various disturbances of a very disadvantageous nature may occur, for example an excessive tape tension may arise when only the winding-off reel is braked, or also tape loops may be formed when the winding-up reel is braked more quickly or sooner than the winding-off reel.

It is an object of this invention to perform the braking process, in particular at high speed, so that the tape is immediately stopped without any disturbances.

In accordance with the invention, both reels, the winding-off and winding-up reels, are braked for this purpose so that the kinetic energy of each single reel is absorbed on each reel thus avoiding excessive tape tension which, as mentioned, can otherwise occur. However, in accordance with the invention, means are provided which assure the braking of the winding-off reel to be somewhat sooner and stronger than that of the winding-up reel. It is a further object of the present invention to provide means which perform this braking process much sooner and much stronger in order to allow it to be adapted to the special operating conditions.

The invention can be carried out by means of mechanical or electrical means or also partly mechanical, partly electrical means.

Figure 1 shows a perspective view of an exemplary arrangement in accordance with the invention.

Fig. 2 is a plan view of the device showing the tape being wound to the right.

Fig. 3 is a plan view of the device showing the tape being wound to the left.

Figure 1:
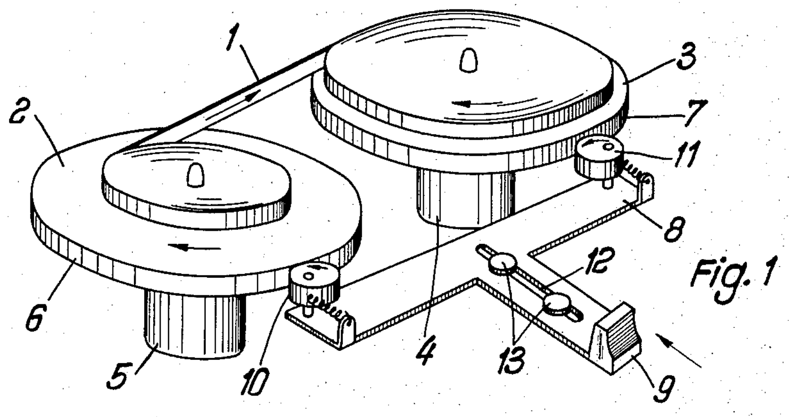
Figures 1 to 3 illustrate an example of a purely mechanical method for solving the problem of the invention.

The magnetic tape 1 is wound from the left hand reel 2 to the right hand reel 3 at normal or high speed, both reels rotating in a clockwise direction. The drive is carried out in known manner by interposing a friction coupling in the drive mechanisms 4 and 5, each of which for example includes a motor. The reversal in the direction of the tape movement may be performed by the drive mechanism 5 so that the tape is wound on to the reel 2 and is wound off the reel 3. The reels 2 and 3 have cylindrical braking surfaces 6 and 7, which are concentric to the axes of rotation. The braking device consists of an adjustable braking control member 8 which, by means of pressure on the handle 9, brings the two braking pulleys 10 and 11 into contact with braking surfaces 6, 7, the control member 8 being moved along the slit 12 guided by pins 13. The braking means 10 and 11 come into contact with the periphery of the reels 2 and 3 simultaneously. However, they are eccentrically mounted, so that one of the two pulleys, preferably that which contacts the winding-off reel, increases automatically the braking effect under the influence of the eccentricity whilst the braking effect of the other pulley which contacts the winding-up reel is delayed automatically owing to the opposed eccentricity, its braking effect, however, being brought into action by further pressure on the handle 9 and further movement of the braking control member 8 towards the reels 2 and 3. In order to attain this effect, the brake lining of the braking pulleys is best provided with a certain elasticity, they are made e.g. from vulcanized rubber, or the braking means themselves are fitted with springs or one of the pins 13 is provided with an elastic mounting.

Figures 2, 3:
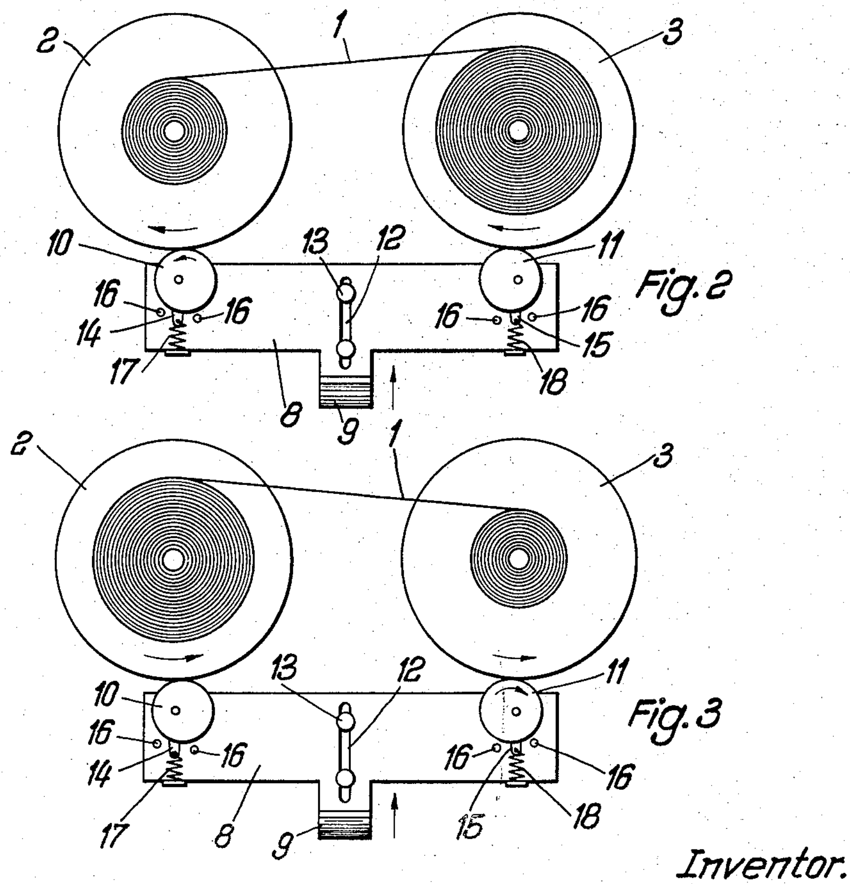

From Figs. 2 and 3, the manner in which the device acts and its arrangement for the two possible directions of rotation may be seen. Referring to Fig. 2, the tape is wound on the right hand reel 3. The two reels rotate in a clockwise direction and the eccentricity of the left hand braking pulley 10 is selected to increase the braking effect automatically as soon as contact is made with the apertaining reel 2. The right hand braking pulley 11 has simultaneously come into contact with the right hand reel 3. Its eccentricity is, however, chosen so that the rotation of the reel 3 in a clockwise direction does not effect an automatic increase of the braking effect. In order to make this clear, the braking pulley 11 is shown in the drawing in such a way that it seems to be separated from the reel 3 by a small distance. If the pressure on the handle 9 is maintained, i.e. the control member 8 is moved nearer to the reel disc 3, then the full braking force of the pulley 11 will be effective too. This is carried out in that the projecting pins 14, 15, fixed to the braking pulleys run between stop-pins 16 which limit the angular turning of the braking shoe. If the member 8 is then moved away from the reel discs, then tension springs 17, 18 which engage on the one side with the member 8 and on the other side with the projecting pins 14, 15, bring the eccentric pulleys 10, 11 into a normal position so that, on repeated braking, the braking pulleys come into contact simultaneously with the two reel discs, whereat, however, once again one braking pulley automatically increases the strength of its braking effect, whilst the other exercises its full braking effect only on further movement of the member 8 towards the reel discs.

In Figure 3, the process is shown with reversed direction of the tape. As can be seen, the right hand braking pulley 11 now increases its braking effect automatically, whilst the left hand braking pulley only exercises its full braking effect when more pressure is applied to the handle 9. In practice, the control member 8 is moved quickly and the braking is performed with one movement by pressure on the handle 9 so that the process above described is completed with almost imperceptible quickness. Finally, the strength of the braking action and also the time interval in which the braking actions follow each other in the desired sequence, may be adjustably varied by choosing the amount of eccentricity, by altering the distance between the limiting stops, by altered tension of the springs 17, 18 or by changing the elastic mounting of one of the guide pins 13.

What I claim is:

1. Magnetic tape recording arrangement comprising a pair of reels rotating in the same direction for winding and rewinding the tape, a drive mechanism for driving said reels including a friction coupling means and braking means for stopping the rotation of said reels said braking means consisting of two pulleys eccentrically mounted on a control member for movement towards and away from said reels and each engageable with one of said reels, thus being adapted to provide by their eccentric mounting an increasing braking effect on one of said reels and a delay of the braking effect on the second of said reels depending on the direction of rotation of said reels, as soon as said pulleys are in contact with said reels.

2. Magnetic tape recording arrangement as claimed in claim 1, wherein stop-pins are provided for limiting the eccentric rotation of said braking pulleys.

3. Magnetic tape recording arrangement as claimed in claim 1, wherein springs are provided to bring said eccentric pulleys to a definite normal position.

References Cited in the file of this patent

UNITED STATES PATENTS

| | | |
|---|---|---|
| 2,555,643 | Harrison | June 5, 1951 |
| 2,664,251 | Berlant | Dec. 29, 1953 |
| 2,782,263 | Hoehn et al. | Feb. 19, 1957 |
| 2,793,039 | Hironimus | May 21, 1957 |